May 22, 1956 K. FEDERN ET AL 2,746,299
APPARATUS FOR THE BALANCE CENTERING OF REVOLVABLE BODIES
Filed June 11, 1951 5 Sheets-Sheet 1

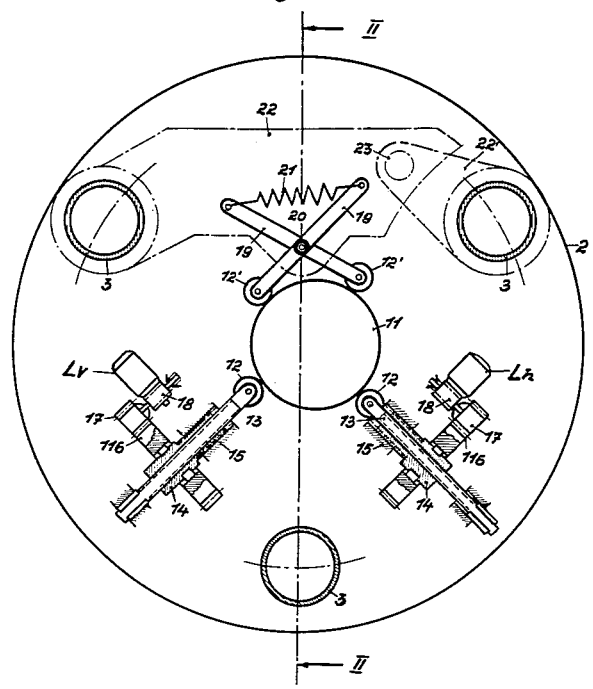
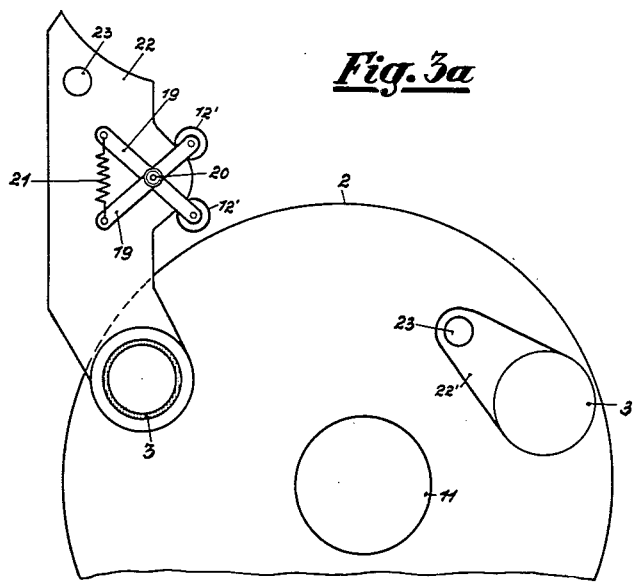

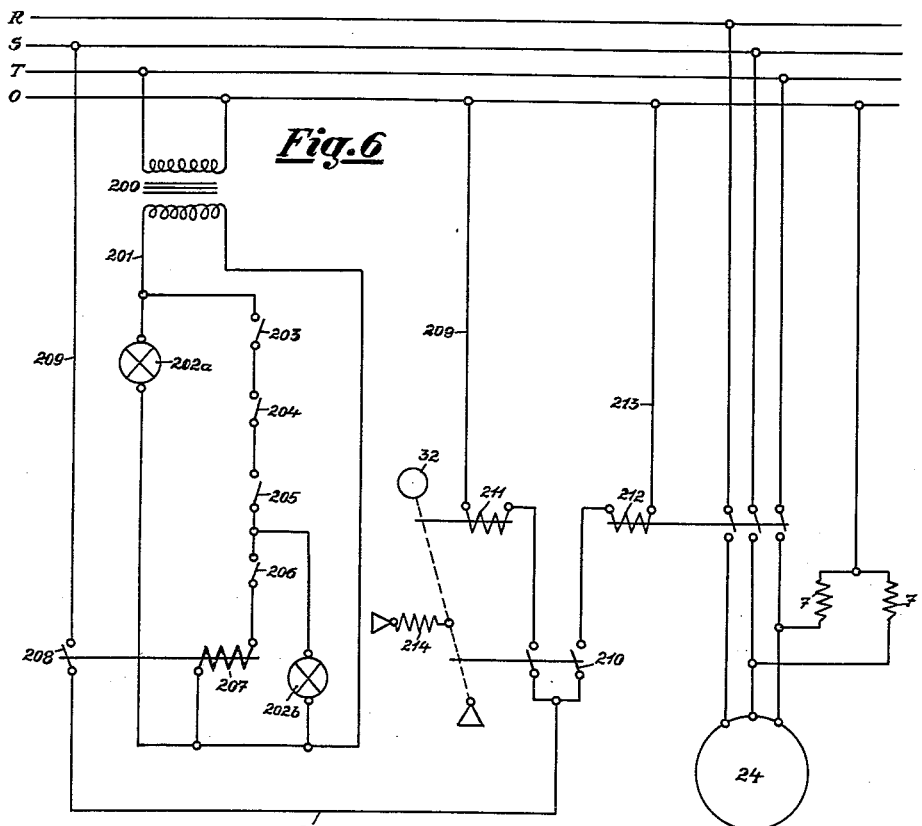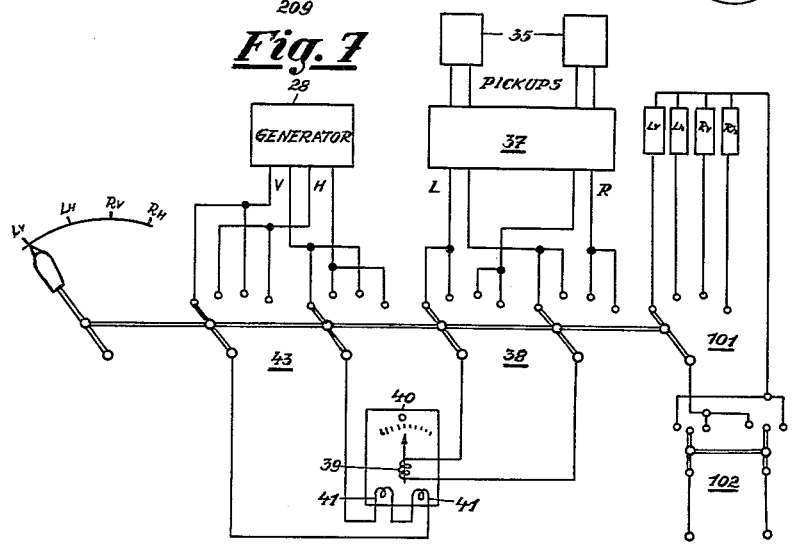

United States Patent Office 2,746,299
Patented May 22, 1956

2,746,299

APPARATUS FOR THE BALANCE CENTERING OF REVOLVABLE BODIES

Klaus Federn, Darmstadt, Heinrich Hack, Gross Zimmern, near Darmstadt, and Walter Kurz, Darmstadt, Germany, assignors to Carl Schenck Maschinenfabrik G. m. b. H., a corporation of Germany Application June 11, 1951, Serial No. 230,928

11 Claims. (Cl. 73—461)

Our invention relates to method and means for balancing revolvable bodies and, more particularly, to the balancing and centering of bodies that are to be subsequently subjected to a balance-affecting machining or other fabricating operation.

Crankshafts, fan and pump rotors, gyroscope rotors and other revolvable bodies that are to be balanced when finished are often manufactured from castings, die-forgings or otherwise prefabricated work pieces that must be center marked, for instance by center drilling, before being completed by machining or other fabricating operations. If the bodies thus finished are considerably out of balance, they are either unsuitable and must be scrapped or an appreciable amount of balancing by corrective addition or substraction of material is necessary. To reduce such losses in material and labor, it has become known to revolve the prefabricated bodies in oscillatorily mounted bearings and to move each body so that its gravity axis coincides with the axis of revolution, and to then center drill the balanced body on the axis of revolution. The known means for thus centering the body include a revolving carrier structure on which the body is mounted and relative to which it is displaceable toward the desired centered position. As heretofore known, however, the balance centering process was an intricate and time consuming matter because the various adjustments could not be clearly separated from one another as regards their individual effects on the balance condition so that repeated resettings, much on the basis of a mere trial-and-error method, were necessary. In many cases, especially with work pieces of balance-asymmetrical shapes, such as crankshafts or eccentric rotor structures, the subsequent machining of the pre-balanced body is apt to introduce new unbalances so that with the known methods a considerable extent of rebalancing remains necessary and the occurrence of appreciable waste is not obviated despite the preceding balance centering.

It is an object of the invention to improve the balance centering of unfinished bodies so that the work piece to be centered for subsequent machining or other fabrication can be brought into balance-centered position during its revolution in a simpler and less time consuming manner than heretofore possible and can be balance adjusted for center marking or machining with a minimum of positional adjustments.

Another, more specific object of my invention is to devise a method and apparatus capable of placing an unfinished rotor into balance-centered position, without trial-and-error testing, by means of at most four accurately defined positioning operations.

According to the invention, in one of its aspects, an unfinished body to be centered or center marked for subsequent machining or other finishing operation is subjected to revolution and, while revolving, is balance-analyzed by determining two coordinately directed unbalance components in one or each of two radial correction planes. For each individual unbalance component thus determined, the body is displaced in the corresponding plane and in the corresponding radial direction relative to the axis of revolution to give the inertia axis of the body a predetermined positional relation to the axis of revolution. For a balance-symmetrical body, each radial displacement, of course, is carried out to the extent needed to eliminate the unbalance component so that the inertia axis and the axis of revolution coincide when the adjustment is completed. As will be explained in a later place, the invention also involves an adjustment of the two axes to a predetermined finite amount of discrepancy. In any event, only four of the above-described positional adjustments of the body relative to its axis of revolution may suffice to give the body the desired centering. Thereafter the body is center marked, for instance, by a punch or drill, to be subsequently machined about the center axis.

According to another feature of the invention, the body to be center adjusted is accommodated in a jig or cage structure which is oscillatorily journalled so as to perform oscillatory movements at the bearings when the cage-and-body unit, while revolving, is affected with unbalance. The unbalance oscillations occurring in two axially spaced correction planes, preferably the radial planes of the journal means are analyzed by electric devices into two co-ordinately directed components for each correction plane, these components being preferably perpendicular to each other. The magnitude of each measured unbalance component is indicated by an instrucent in the customary manner. The four individual indications thus obtained are transferred to four correlated positioning devices which permit shifting the body radially with respect to the cage structure in two co-ordinate directions within each correction plane so as to place the inertia axis of the body into the desired relation to the axis of revolution, for instance, so that both axes coincide. In the latter case, the instrument does not indicate unbalance once the positional adjustment is completed. The four positioning devices may be operated by respective electric motors and are disposed in pairs, each pair being mounted on the revolving cage structure in or near one of the two correction planes. Each of the positioning devices affects only one of the four correlated unbalance components. The postional changes produced by the positioning devices cause corresponding changes in the static and dynamic balance condition of the cage and the body to be centered. This is so because any positional change displaces the gravity center of the whole revolving unit as well as the angular position of the inertia axis of the body relative to the axis of cage revolution. These two effects are combined in the indication of the measuring instrument. A four-position selector switch is used to switch the instrument for response to only one of the four respective unbalance components at a time. By applying such a selectively switchable circuit connection, the operation of either positioning device in each correction plane has no effect on the indications of the instrument representing the other unbalance component in the same plane or the unbalance components in the other correction plane. To achieve such a response of the instrument to only one component in only one correction plane, the balance analysis must be phase dependent; that is, the indicating instrument, such as a wattmeter, must be sensitive to unbalance signals of a definite angular relation to the revolution of the rotor being analyzed. This phase dependence is established by means of a transmitter or generator which revolves in synchronism with the revolving rotor and which issues two phase-different alternating currents for exciting the field coil of the wattmeter. Only one of these currents is effective at a time so that the instrument can respond only to those unbalance components that are in phase with that one current. The phase positions of the respective two currents are correlated to the directions of the unbalance components. Consequently, the wattmeter can respond only if an unbalance effect occurs in the predetermined directions of the unbalance components. This means that the component directions and the displacing directions of the positioning devices must coincide if any one of the positioning devices, when in operation, is to produce a change in instrument indication.

According to another feature of the invention the four-position switch which controls the instrument indication as to the particular unbalance component to be analyzed at a time, is combined with a selective control switch for the four unbalance-correcting positioning devices so that in each position of the four-position switch only the one positioning device can operate that corresponds to the direction of the one unbalance component then responded to by the instrument. As a result, the same switch adjustment that selects the unbalance component to the analyzed also selects the pertaining correction device thus reducing the operator's control activities to a simple and fool-proof operation.

The foregoing and other objects, advantages, and features of the invention will be further understood from, or will be referred to, in the following in conjunction with a description of the embodiments illustrated on the drawings in which:

Fig. 3 is a section through a cage structure of the machine for accommodating the body to be center drilled, the section being taken on the line III—III of Fig. 2;

Fig. 3a is a partial view similar to Fig. 3 but showing the cage structure in its open condition;

Fig. 6 shows a wiring diagram of safety interlock devices pertaining to the apparatus according to the preceding figures.

Fig. 7 shows schematically a four-position switch and the correlated electric circuits of the machine according to Figs. 1 to 3.

Figure 1:
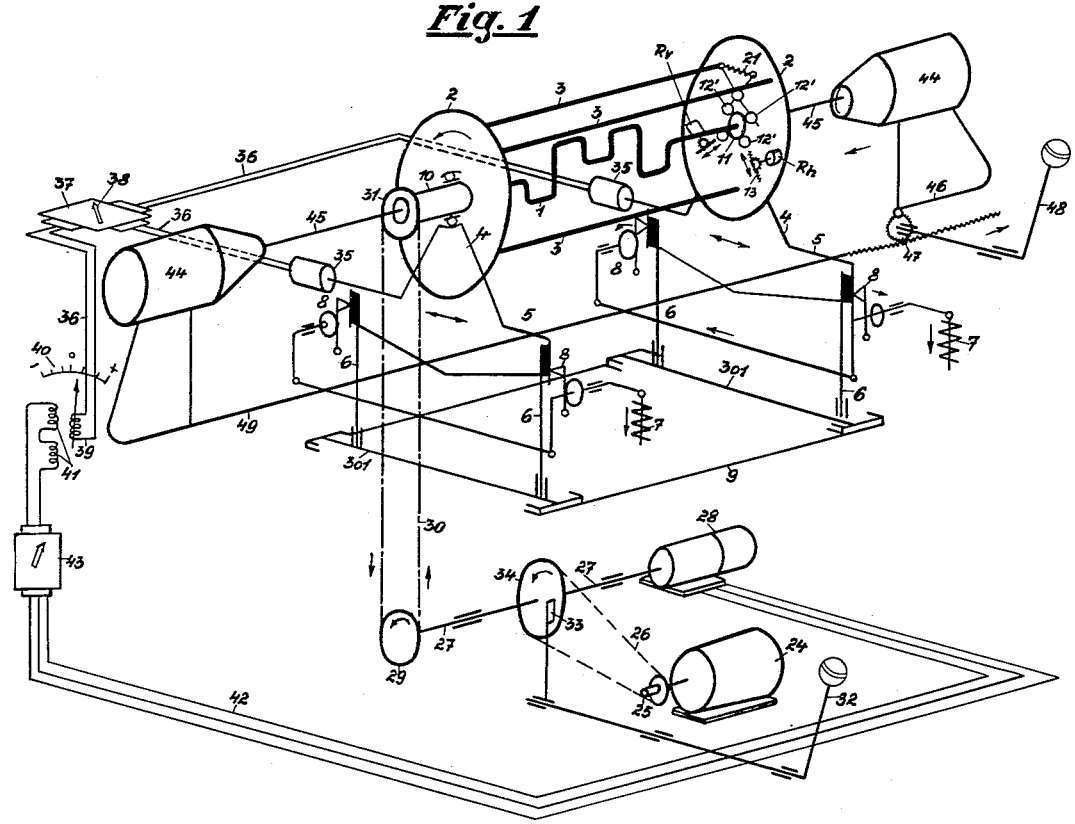
Fig. 1 shows diagrammatically a perspective view of the general arrangement of apparatus in accordance with the present invention.

Referring to Fig. 1, a body 1 to be balanced and then centered, in this instance a crankshaft, is rigidly supported in a cage incorporating a pair of discs 2 connected together by rods 3. The body 1, being either raw or partly machined, is previously shortened to accurate length between its axial end faces. If desired, this length may correspond to the axial distance between stops (not shown) on the respective interior faces of the discs 2, which stops are preferably adjustable and permit securing the body 1 against displacement in the axial direction.

The cage structure 2, 3 has two coaxial hollow shafts 10 journalled in bearings 4 of respective bearing bridges 5 mounted on leaf springs 6 so as to be capable of oscillating substantially only in the horizontal direction. Two electromagnets 7 are provided for controlling (in a manner more fully described hereinafter) four stops 8 located on both respective sides of each bearing bridge 5 to permit clamping the bearing bridges against oscillation during drilling and during insertion and removal of the body 1.

An alternating-current motor 24, controlled by a main switch lever 32 (in a manner to be more fully described hereinafter), serves to drive the cage structure 2, 3 with the enclosed body 1 through an overload slip clutch 25, a V-belt 26 and a belt sheave 34 which is mounted on an intermediate transmission shaft 27 and can be braked by a friction brake 33. Shaft 27 is connected to a two-phase generator 28 capable of generating two alternating currents phased 90° apart. Shaft 27 also carries a sprocket wheel 29 driving through a chain 30, a sprocket wheel 31 on the end of the cage shaft 10. The supports of springs 6 are firmly secured to a machine frame 9 but are displaceable relative to the frame to permit adapting the bearing structures to varying lengths of cage 2, 3. Though for the sake of clarity the motor 24 and generator 28 with the associated parts are shown in Fig. 1 separate from the machine frame 9, it should be understood that they are also mounted on that frame.

Any mechanical oscillations of the bearing bridges 5, resulting from an unbalance of cage 2, 3 and enclosed body 1 during rotation, is transferred to electric pickups 35, for instance of the moving-coil type, which translate the oscillations into alternating voltages. Conductors 36 apply these voltages into a potentiometer network 37 of known type incorporating a part 38 of a four-position switch. From network 37, the alternating voltages after being proportioned by superimposition in the network, are impressed upon a moving coil 39 of a sensitive center-zero wattmeter 40. The alternating currents produced by the generator 28 are fed through conductors 42 to another part 43 of the four-position switch and thence to stationary field coils 41 of the wattmeter 40. The wattmetric system may be in accordance with the one described in the German periodical Zeitschrift Des Vereins Deutscher Ingenieure, vol. 88, 1944, pages 358 and 359. The potentiometer network 37 (Figs. 1, 7) forms a component of this known system. The switch part 43, in practice and as shown in Fig. 7, pertains to the same four-position switch as the part 38. Switch part 43 is essentially a selector whose position determines which of the two differently phased alternating currents produced by the generator 28 is fed to the field coils 41 for selectively measuring at a time either the horizontal or the vertical unbalance components (Figs. 1, 7). Since the generator 28 is synchronized with the rotation of the cage, the excitation of the wattmeter field coils varies periodically in the rhythm and in the adjusted fixed phase relation to the revolutions of the body to be balanced. The deflections of the wattmeter pointer is proportional to the product of the pickup voltages as applied to moving coil 39 and the phase-adjusted generator current through field coils 41 and, hence, is not dependent upon the absolute value of the unbalance but corresponds to only that component of unbalance which is in phase with the field coil current. Since the generator current is so phase adjusted that it determines the unbalance components in two predetermined and mutually perpendicular directions, the operation of the four-position switch 38, 43 permits obtaining respective wattmeter readings which correspond to the individual four unbalance components i. e. the left-vertical, left-horizontal, right-vertical and right-horizontal unbalance components. The four-position switch is provided with markings LV, LH, RV, RH (Fig. 7) for obtaining these readings.

It will be understood that the terms "horizontal" and "vertical" as here used serve only for indicating a mutual angular relation between the two coordinate directions but are not intended to denote directions relative to space, since any angular position of the cross of coordinate axes may be chosen. It should further be understood that the two coordinate directions, if desired, may include an angle different from 90°, provided the mutual phase displacement of the two reference currents delivered from the generator 28 has a corresponding angular value.

Correlated to the positions LV, LH, RV, RH of the switch are respective electric displacing devices which, in the illustrated embodiment, consist of four electrical adjusting motors, although it will be understood that other electrical or mechanical displacing devices may be used instead. These motors are denoted by L*v*, L*h*, R*v*, R*h*. The four adjusting motors are controlled by the four-position switch in such a manner that, dependent upon the selected positioning of the switch, only the one motor is put in operation that is correlated to the unbalance component then being analyzed. This one motor then displaces the body 1 an amount accurately corresponding to the value of component unbalance indicated by the meter 40 with the result that this unbalance is eliminated. This will be further described in a later place.

Figure 2:
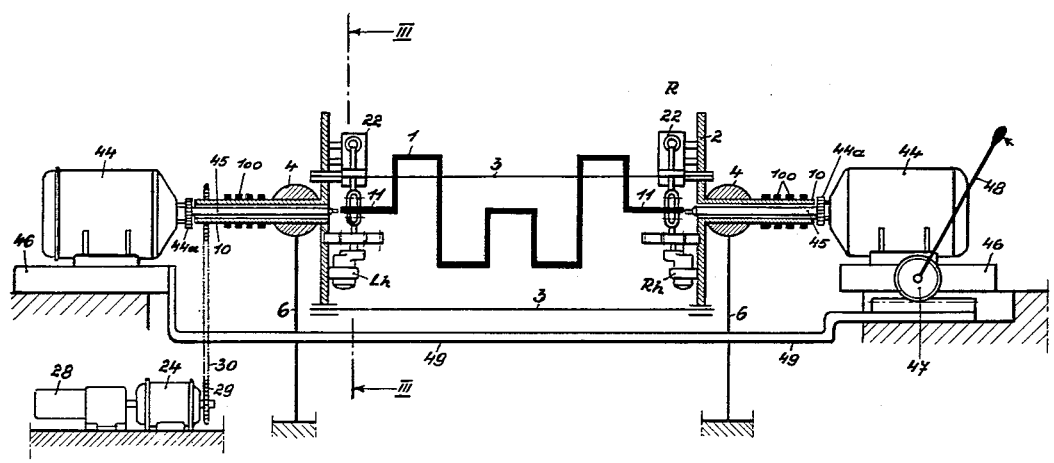
Fig. 2 shows a longitudinal section through the machine of Fig. 1 taken on the line II—II indicated in Fig. 3.

Referring now more particularly to Figs. 2, 3 and 3*a*, the two axial ends 11 of body 1 which fit accurately against the discs or the above-mentioned stops, thus being prevented from axial movement, are each held by four support rollers 12 and 12'. These rollers constitute, in effect, a three point suspension of the ends 11, since the two support rollers 12' are pivoted about a common fulcrum 20, which is normally stationary and is also the gravity center of a balanced scissor-like lever system on which the rollers 12' are mounted. The two rollers 12' are urged towards one another and into contact with the periphery of the body end 11 by means of a coiled tension spring 21 connecting the two ends 19 of the lever system remote from the rollers 12'. The center of gravity of the scissors system is constant for every angular setting of the two levers relative to each other.

The fulcrum 20 of each lever system is connected to a locking lever 22 pivoted about one of the connecting rods 3 and engageable by a spring-biased latch pin 23 at the end of an arm 22' mounted about another connecting rod 3. The two locking levers 22 are thus securely latched in position during the machine operation by the respective latch pins 23. When the pins 23 are withdrawn, the respective locking levers 22 can be swung upwardly from the position shown in Fig. 3, thereby opening the cage structure to permit the removal or insertion of the body 1. The two latch pins 23 also serve for the control of safety contacts which prevent a premature operation of the drive motor as will be described in a later place with reference to Fig. 6.

The two support rollers 12 are journalled on respective threaded spindles 13 (Fig. 3) which are angularly spaced 90° from each other. Each spindle 13 is guided in a sleeve 15 provided with differential threads. Each sleeve 15 has a grooved part 14 joined with a spur gear 116. Gear 116 meshes with a pinion 17 driven through a worm drive 18 from one of the four respective adjustment motors. The difference in pitch of the two threads on spindle 13 and sleeve 15 causes a relative motion in opposite directions to occur between spindle and sleeve when part 14 is being rotated. The amount of the resultant displacement of the spindle is determined by the pitch difference of the two threads. Thus, the spindle mechanism operates as a high reduction gear for converting rotational motion of the adjusting motor for instance, L*v* in Fig. 3 into finely adjustable axial displacement of spindle 13 and roller 12. The weights of the spindles 13 and sleeves 15 are selected in relation to their thread pitches so that a weight balance is maintained for any radial displacement of the spindles. Therefore, a change in adjustment of the spindles 13 and of the scissors system for rollers 121 does not affect the dynamic balance condition of the cage 2, 3.

The four adjustment motors L*v*, L*h*, R*v*, R*h* (Fig. 4) are adapted for clockwise and anti-clockwise rotation and are desirably run at high speeds, for example, at 1700 R. P. M. so that, in conjunction with the high reduction gearing of the spindle drive, a fine radial adjustment of the rollers 12 can be effected thus securing the desired accurate displacement of the inertial axis of the body 1.

When the above-mentioned locking levers 22 are closed and latched by the pins 23, the force of the then tensioned springs 21 is so high that the body 1 is prevented from unintentional rotation relative to cage 2, 3 solely by the friction due to the combined pressures of the eight rollers 12, 12'; and the body requires no further clamping means during the center drilling operation to be hereinafter described. Besides, during the drilling operation, the cage 2, 3 is kept freely rotatable in its bearings to permit some rotary movement of the cage for equalizing any differences in torque that may occur, for instance, due to different wear of the drilling tools. However, during the drilling operation the bearing bridges 5 are prevented from oscillation by means of the magnetically operated stops 8 (Fig. 1) above referred to.

Figure 4:
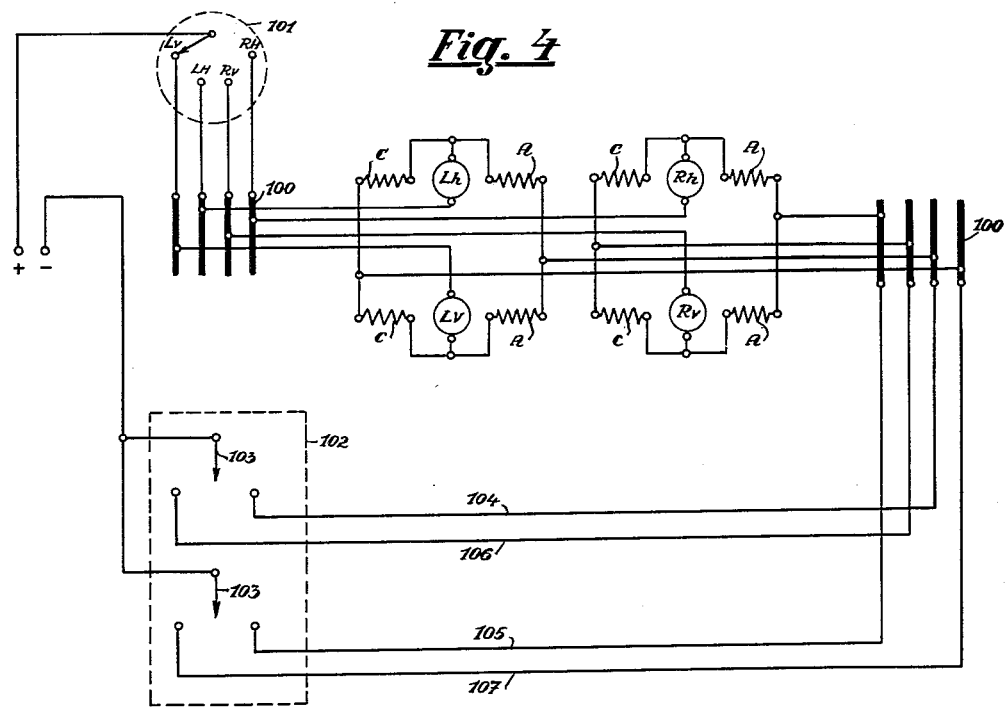
Fig. 4 shows a wiring diagram for four adjustment motors pertaining to the apparatus.

Referring now more particularly to Fig. 4, the above-mentioned four-position switch (38, 43 in Fig. 1) has a third part 101 with four selectively operable contact means (see also Fig. 7). In each position (i. e. LV, LH, RV, RH) of part 101, one of the respective four contact means is connected to one of the four adjustment motors so that only that one motor can be started whose operation is required for adjustment in accordance with the component of unbalance then being determined. This circuit arrangement, shown in Fig. 4, obviates the need for the otherwise required four control levers, one for each of the four motors. When the four-position switch is set, for instance, to position LV so that only the left hand vertical component of unbalance is being tested and indicated on the wattmeter, only the associated adjusting motor (Fig. 4) can be started. The motor energizing circuits extend through a toggle switch 102 with two contact members 103 that, when actuated, move together in one or the other direction so that either the circuit leads 104, 105 or the leads 106, 107 are connected to one pole of the current supply. For each position of switch part 101 and each conjoint position of switch 102, only the properly selected one of the motors can be energized at a time. It may be desirable to provide the switch 102 with several settings controlling different adjustment speeds of the motors for the two directions of rotation respectively. It will be seen from Fig. 4 that the four adjusting motors are direct current motors of the kind having two field windings, such as those denoted by C and A. The current supply to the motors is provided at both ends of the cage by way of four slip rings 100 (Figs. 2 and 4) and the one motor which is preselected by the switch 101 is started in the required direction of rotation by means of the switch 102 which, as explained, if moved to the right establishes contact simultaneously with conductors 104 and 105 and if moved to the left with conductors 106 and 107.

Figure 5:
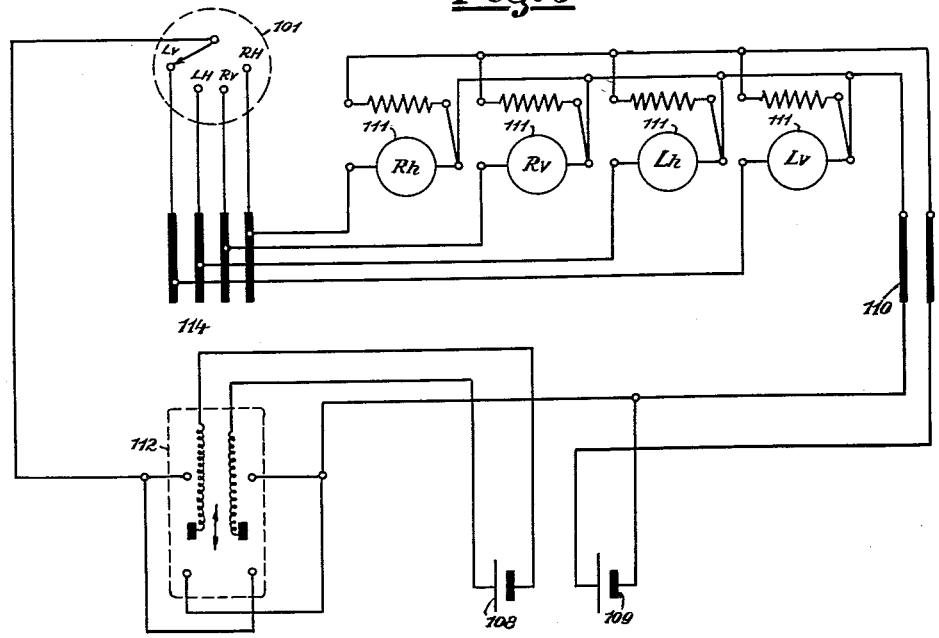
Fig. 5 shows a variation of the wiring diagram shown in Fig. 4.

If adjusting motors with only one field coil are to be used, then the wiring diagram of Fig. 5 may be used. According to Fig. 5, two current sources schematically shown at 108 and 109 are provided to feed into a three line system. Current source 109 is connected by way of two slip rings 110 to the field coils 111. Current source 108 is connected through a reversing switch 112 (corresponding to the switch 102 in Fig. 4 and Fig. 7) through the part 101 of the four-position switch by way of four slip rings 114 to the individual adjusting motors.

The drilling mechanism of the machine comprises two drill spindles 45 (Figs. 1, 2) operable by two respective geared drive motors 44 which are mounted on slides 46. The drill spindles 45 pass through the bores of the respective hollow shafts 10 of the cage structure. A feed control lever 48 is radially mounted on a spindle which is journalled in the one slide 46 and carries a pinion 47. Pinion 47 meshes with a rack connected through a linking rail 49 to the other slide 46, adjustable stops being provided to limit the permitted feed movement of the drills. It will be apparent that by rotation of the lever 48 to the left, as viewed in Figs. 1 or 2, the two drill spindles 45 are moved toward each other into contact with the respective end faces of body 1. Due to the joining link 49, the drill pressures balance each other and the support and bearings of the cage 2, 3 are kept free of drill pressures. For the same reason the stops for limiting the feed movement of the drilling device do not act upon the machine frame or against the bearing brackets but against a hub of the cage. These stops are shown in Fig. 2 at 44a. They consist of flanges that abut against the ends of the respective shafts 10 of the cage structure.

To prevent a premature starting of the cage drive motor 24 as well as an untimely operation of the drill spindles, the pertaining motor control circuits are equipped with safety interlocks which will be described with particular reference to Fig. 6. The secondary winding of a transformer 200 of a power supply line RSTO supplies alternating current, for example of 24 volts, to the circuit 201 of a signal lamp 202a (for instance, a white lamp) which, when lit, indicates that the transformer is energized (see also Fig. 8). Four safety contacts 203, 204, 205, 206 are connected in series with each other, and in series with the coil 207 of a relay, across the lamp 202a. Contacts 203 and 204 are mounted on the respective locking levers and controlled by engagement of the latch pins 23 with the respective locking levers 22 so that contacts 203, 204 are closed only when the locking levers are latched in the operative position. The third contact 205 is mounted on one of the slides 46 for the drills 44 and is closed only when the drill mechanism is in inactive position. Another signal lamp 202b (for instance, green) is connected across the series connection of contact 206 and relay coil 207. Contact 206 is associated with an arresting lever 206' (Fig. 8) which serves locking the cage against rotation and is joined with the main switch lever 32 (Figs. 1, 6, 8) to be released from the cage when the main switch lever is switched in, then also closing the contact 206. If, therefore, the latch pins 23 are in engagement with the locking levers 22, the drills are removed from the body 1 and the arresting lever is removed from the cage, then the relay coil 207 is energized through the closed contacts 203, 204, 205, 206 and closes the relay contact 208. The circuit 209 of contact 208 includes a double-contact switch 210 and a holding magnet 211 serving to retain the main switch lever 32 in the operative position. The switch lever 32 is spring loaded towards the inactive position by means of a spring 214; and only with all contacts 203, 204, 205 and 206 closed, can the lever 32 be held in the operative position by the action of the holding magnet 211. The switch lever 32 when in the operative position closes both contacts of switch 210 and thereby energizes the holding relay 211 and also starts the cage drive motor 24 by energizing the circuit 213 of a contactor coil 212. Starting of the motor 24, therefore, is impossible unless all safety contacts are closed. Energization of the motor 24 also causes excitation of the magnets 7 to remove the stops 8 from the bearing bridges 5.

The operation of the machine is as follows. The machine is first calibrated by dynamically balancing the cage without a body 1 in the bearing brackets with the aid of correction weights provided on the discs 2 so that the wattmeter 40 will read zero for all positions of the four-position switch 38, 43, 101. With the cage thus balanced, the cage, at standstill, is opened by swinging the locking levers 22 upwardly to the position shown in Fig. 3a. The crankshaft or other body 1 to be center drilled is then inserted and the levers 22 are turned downwardly to the position shown in Fig. 3 and locked in position by means of the latch pins 23. Then the motor 24 is started and the potentiometer circuit 37 (Figs. 1, 7) is adjusted to the gravity center axis of the entire oscillation system in known manner so that the unbalance-responsive displacement of the left-hand end of the crankshaft does not influence the unbalance indication for the right-hand end, and vice versa. Once this calibration has been effected, the electric setting may be maintained for all similar bodies to be center bored, for instance for all crankshafts of the same series of manufacture.

Figure 8:
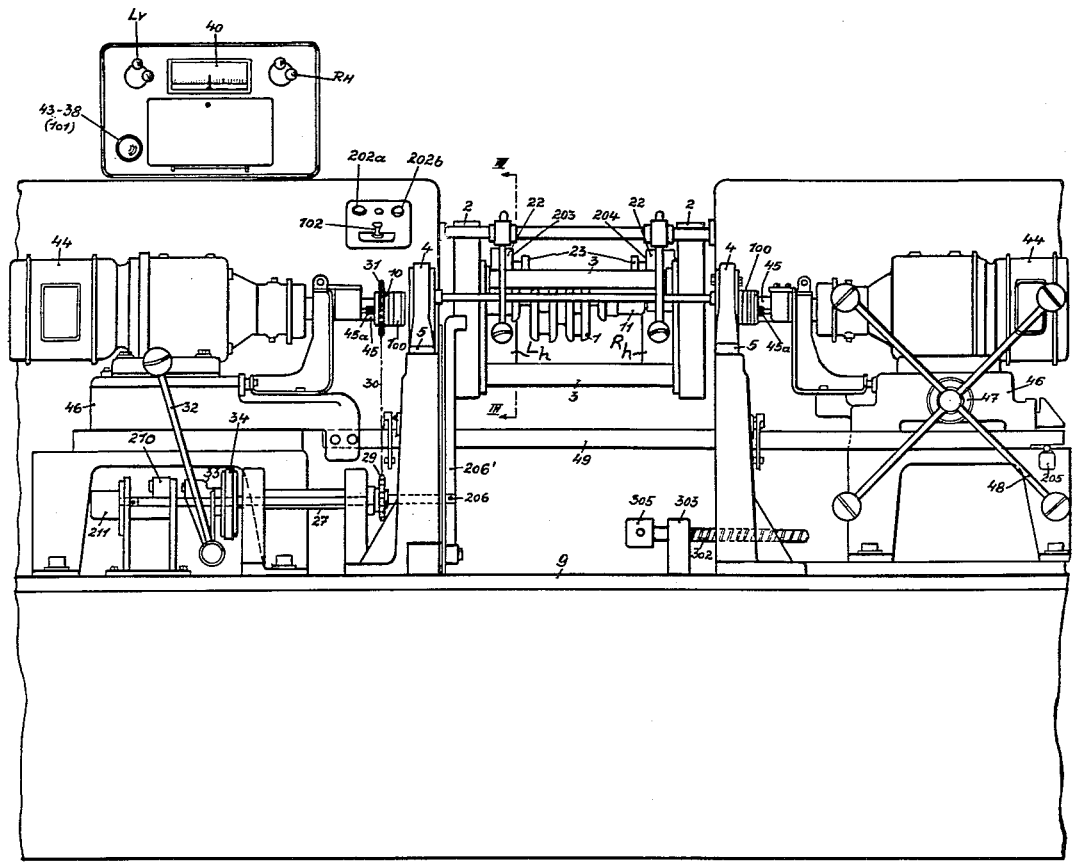
Fig. 8 is a view of the machine seen from the operator's side.

At this stage, the drill presses are still inactive, and only the described three safety contacts 203, 204 and 205 (Fig. 6) are closed. This condition is indicated by lighting of the green lamp 202b (Figs. 6, 8). This signals to the operator that he may now actuate the main switch lever 32 (Figs. 1, 6, 8). As mentioned, the switching of lever 32 has the effect of automatically releasing the cage for rotation and closing the fourth safety contact 206. Contact 206 energizes the relay coil 207 which closes the relay contact 208 in the circuit 209. Since at that time the contacts 210 are closed by actuation of lever 32, the circuit 209 is now completed for energizing the holding magnet 211. The second contact of switch 210 simultaneously energizes the contactor 212 which energizes the drive motor 24 as well as the release magnets 7. Magnets 7 release the previously arrested bearing bridges 5 for oscillatory motion, and the cage is now driven from motor 24 through the chain transmission 29, 30, 31. One of the four unbalance components at a time is now tested and indicated by the meter 40, depending upon the selected position of the four-position switch. By actuating the reversing switch 102 (Fig. 4) or 112 (Fig. 5), the proper adjusting motor is started to move the body laterally in the cage so as to compensate for the component of unbalance until the meter reads zero. This procedure is repeated for the other three unbalance components. Thereafter the above described adjusting operation involving the four motors Lv, Lh, Rv, Rh is terminated. The inertial axis through the body 1 is now coincident with the longitudinal axis of the cage 2, 3 and with the axis of the drill spindles 45, and the cage with the body 1 now runs free of unbalance oscillations.

For actuating the brake 33 (Fig. 1), the main switching lever 32 is now displaced a sufficient extent to open the switch 210 and to bring the cage to a stop but not far enough to bring the cage arresting device into action. Hence, the cage is not yet blocked but is permitted to revolve in its bearings during the subsequent drilling operation.

The center drilling is now effected by actuating the lever 48 whose rotation causes the two drill spindles to advance toward each other. The drill motors 44 are then to be switched in. This is preferably done automatically by having the initial actuation of lever 48 actuate a trip switch (not shown) in one of the slides 46. Consequently, the drill spindles are in revolution when during the further displacement of lever 48 the spindles enter into contact with the ends of the body 1 so that holes are drilled on the inertial axis of body 1. The drill spindles continue to approach each other until the above-mentioned, previously adjusted stop abuts against the hubs of the cage and limits the drilling depth.

When the drilling is completed and the drilling tools are shifted back to their rest position, the main control lever 32 can be further displaced, brake 33 remaining released, until the arresting latch enters into a matching groove of the cage and thus locks the cage. After releasing the latch pins 23, the locking levers 22 are opened and the accurately centered crankshaft can be removed.

It will be understood from the foregoing that the four positioning motors may be individually controlled in any suitable manner, for instance, by manual activity of the operator who sets the four-position switch, thereby selecting the one motor that is to operate at a time, and who also positions the reversing switch 102 in Fig. 4 or 112 in Fig. 5, to make the selected motor run in the one suitable direction.

In apparatus built and operated in accordance with the foregoing description, the entire procedure required as little as two to three minutes.

It will be obvious to those skilled in the art, upon a study of this disclosure, that our invention permits of various changes and modifications and may be embodied by means other than those specifically illustrated, without departing from the objects and essence of the invention and within the scope of the claims annexed hereto.

We claim:
1. Apparatus for the balance-centering of revolvable bodies, comprising a revolvable and oscillatorily journalled carrier for accommodating a body to be centered; phase-dependent balance measuring means responsive to two prelocated unbalance components in each of two transverse planes of said carrier, said balance measuring means having pickups disposed substantially in said two planes to provide two voltages responsive to unbalance oscillations, two sources of reference voltages of different phase synchronous with the carrier revolution, a wattmetric instrument, and first selector switch means connecting said instrument with said pickups and said sources to selectively apply said voltages to said instrument whereby said instrument responds to only one of said respective four unbalance components at a time; four individually controllable positioning devices mounted on said carrier and engageable with the body for displacing it relative to the axis of revolution, two of said positioning devices being disposed substantially in each of said two planes and having respective directions of body displacement corresponding to the directions of said two respective unbalance components in said plane; and second selector switch means connected with said four positioning devices for operating a selected one of them at a time; said first and second selector switch means being connected with each other so that the plane and displacement direction of each selected positioning device during the operation of said device corresponds to the plane and direction of the one unbalance component then being indicated by said instrument.

2. Apparatus for the balance-centering of revolvable bodies, comprising a revolvable and oscillatorily journaled cage structure for accommodating a body to be centered; electric circuit means responsive to two coordinate unbalance components in each of two axially spaced transverse planes of the cage structure, said circuit means having two sources of reference voltages of different phase synchronous with the cage revolution and having oscillation pickups disposed substantially in said respective planes and responsive to radial oscillations of said structure, said circuit means having a measuring instrument and a selector switch connected with said instrument for connecting it to react to a selected one of said four components at a time; four individually controllable positioning devices mounted on said cage structure and engageable with the body for jointly controlling the position of the body inertia axis relative to the axis of revolution of said cage structure, two of said devices being disposed near each of said respective planes and having in said plane respective body-positioning directions corresponding to the directions of said two unbalance components to successively position the body in dependence upon said respective components to a desired mutual relation of said two axes, each of said four positioning devices having a reversible and individually controllable electric motor mounted on said cage structure, energizing circuit means for said four motors comprising selective contact means joined with said selector switch to operate together therewith and electrically connected with said four motors for selecting the one motor that is to operate in accordance with the one component responded to by said instruments at a time, said energizing circuit means including a reversing switch connected with said motors for controlling the direction of motor operation.

3. In apparatus according to claim 2, each of said positioning devices comprising an axially displaceable threaded spindle having at one of its ends a roller engageable with the body, said spindle being guided for axial movement relative to said cage structure, a revolvable sleeve on said spindle, said spindle and said sleeve being axially movable relative to each other in mutually opposed directions to maintain continuous balance of said cage structure during adjusting operation, said sleeve having differential thread portions in threaded engagement with said spindle and with said cage structure respectively for displacing said roller by revolution of said sleeve, transmission means connecting said sleeve with one of said respective motors, whereby said motor causes said spindle to move axially in a sense depending upon the running direction of said motor.

4. In apparatus according to claim 3, said sleeve on the one hand and said spindle with said roller on the other hand having respective weights whose ratio corresponds to the pitch ratio of said differential thread portions so that said sleeve-and-spindle combination has a substantially fixed center of gravity in all axial positions of said spindle relative to said sleeve.

5. Apparatus for the balance-centering of revolvable bodies, comprising a fixed supporting structure and a revolvably and oscillatorily journalled carrier mounted on said structure for revolving a body to be centered; phase-dependent unbalance-measuring means having a pickup disposed in a plane transverse to the axis of revolution of said carrier and selectively responsive to one of two coordinate unbalance components of the body in predetermined respective directions within a transverse plane of the body, said unbalance-measuring means having a source of reference voltages of different phase synchronous with the carrier revolution, said unbalance-measuring means comprising a selectively operable switch connected with said pickup and said reference voltage source determining the one unbalance component to be measured at a time; two individually operable positioning devices engageable with the body, each of said devices having in said plane a linear displacing direction corresponding to the direction of one of said respective components; control means connected with said positioning devices for controlling said devices to displace the body in accordance with the measured amounts of said unbalance components, said control means comprising selector means connected with said switch to be actuated in a fixed relation to said swtich, said selector means connecting a selected one of said devices at a time with said control means.

6. Apparatus for the balance-centering of revolvable bodies, comprising a rigid supporting structure and a revolvable and oscillatorily journalled carrier mounted on said structure for revolving a body to be centered; balance analyzing means having two pickups disposed in two respective transverse planes axially spaced from each other relative to the axis of revolution of said carrier, said analyzing means having two sources of reference voltages of different phase synchronous with the carrier revolution, said analyzing means having selectively phase-dependent measuring means connected with said pickups and said reference voltages sources for indicating two coordinate unbalance components of the body in predetermined respective directions within each of said two planes, and said analyzing means comprising selective switch means determining the one of the four unbalance components to be indicated at a time; two individually operable positioning devices disposed on said carrier and engageable with the body in each of said respective planes for displacing the body relative to said carrier, each of said two devices in each plane having a linear body-displacing direction corresponding to the direction of one of said two coordinate components; selective control means operatively connected with said switch means so as to have a selecting operation fixedly related to that of said switch means, said selective control means being connected with said four positioning devices to control only one of said respective devices at a time to displace the body in accordance with the indicated amount of the correlated one unbalance component.

7. Apparatus for the balance-centering of revolvable bodies, comprising a fixed supporting frame structure, two oscillatory journal means mounted on said structure, a cage structure for accommodating a body to be centered, said cage structure being revolvable in said journal means, a drive joined with said cage structure for revolving it; electric phase-dependent unbalance-measuring means associated with said journal means and selectively responsive to two coordinately directed oscillation components due to unbalance at each of said two journal means, said electric phase-dependent unbalance-measuring means comprising a pair of pickups, fixed with respect to said supporting structure and operative to provide respective output voltages responsive to unbalance oscillations of said cage structure at each of said two journal means, said electric phase-dependent unbalance-measuring means comprising two sources of reference voltages of different phase synchronous with the cage revolution; four individually controllable positioning devices mounted on said cage structure and engageable with the body for jointly controlling the position of the body inertia axis relative to the axis of revolution of said cage structure, a pair of said devices being disposed near each of said respective journal means and having respective displacing directions corresponding to the direction of the respective two components at said journal means, a selector switch having four selective positions and having two interconnected portions operative in a fixed relation to each other, one of said switch portions forming part of said unbalance-measuring means so as to determine the one unbalance component to be measured at a time, and the other switch portion being connected with said four positioning devices to select for operation only the one of said four positioning devices that permits compensating the one oscillation component simultaneously being measured by said measuring means.

8. Apparatus for the balance-centering of revolvable bodies, comprising a rigid supporting structure having two axially spaced oscillatory journal means, a cage structure for accommodating a body to be centered, said cage structure being revolvable in said journal means, a drive joined with said cage structure for revolving it; electric unbalance-measuring means joined with said journal means and selectively responsive to two coordinately directed oscillation components due to unbalance at each of said two journal means, said electric unbalance-measuring means comprising a pair of pickups fixed with respect to said supporting structure and operative to provide respective output voltages responsive to unbalance oscillations of said cage structure at each of said two journal means, said electric unbalance-measuring means comprising two sources of reference voltages of different phase synchronous with the cage revolution; four individually controllable positioning devices mounted on said cage structure and engageable with the body for jointly controlling the position of the body inertia axis relative to the axis of revolution of said cage structure, a pair of said devices being disposed near each of said respective journal means and having respective displacing directions corresponding to the directions of the respective two components at said journal means, whereby each of said positioning devices adjusts the body relative to said carrier in dependence upon the amount of only one of said respective components measured by said measuring means; the two positioning devices of each pair having two respective rollers engageable with the body, and a scissor-type abutment mechanism having two spring biased levers jointly pivoted on said cage structure and having two rollers journalled on said respective levers and engageable with the body at points about opposite said two first-mentioned rollers, said mechanism having a substantially fixed gravity center independent of changes in angular position of said levers.

9. Apparatus for the balance-centering of revolvable bodies, comprising a rigid supporting structure having two axially spaced oscillatory journal means, a cage structure for accommodating a body to be centered, said cage structure being revolvable in said journal means, a drive joined with said cage structure for revolving it; electric unbalance-measuring means joined with said journal means and selectively responsive to two coordinately directed oscillation components due to unbalance at each of said two journal means, said electric unbalance-measuring means comprising a pair of pickups fixed with respect to said supporting structure and operative to provide respective output voltages responsive to unbalance oscillations of said cage structure at each of said two journal means, said electric unbalance-measuring means comprising two sources of reference voltages of different phase synchronous with the cage revolution; four individually controllable positioning devices mounted on said cage structure and engageable with the body for jointly controlling the position of the body inertia axis relative to the axis of revolution of said cage structure, a pair of said devices being disposed near each of said respective journal means and having respective displacing directions corresponding to the directions of the respective two components at said journal means; the two positioning devices of each pair having two respective rollers engageable with the body, and a scissor type abutment mechanism having two spring biased levers jointly pivoted on said cage structure and having two rollers journalled on said respective levers and engageable with the body at points about opposite said two first-mentioned rollers, said mechanism having a biasing spring connected between said elevers to urge said lever rollers toward each other, and said spring having a force sufficient for frictionally securing the body against rotation relative to said cage structure.

10. Apparatus for the balance-centering of revolvable bodies, comprising a fixed supporting frame structure, two journal means oscillatorily mounted on said frame structure in axially spaced relation to each other, a cage structure for accommodating a body to be centered and having means to secure said body in said cage structure, said cage structure being revolvable in said journal means, a drive joined with said cage structure for revolving it; electric phase-dependent unbalance-measuring means associated with said journal means and selectively responsive to two coordinately directed oscillation components due to unbalance at each of said two journal means, said electric phase-dependent unbalance-measuring means comprising a pair of pickups fixed with respect to said supporting structure and operative to provide respective output voltages responsive to unbalance oscillations of said cage structure at each of said two journal means, said electric phase-dependent unbalance-measuring means comprising two sources of reference voltages of different phase synchronous with the cage revolution; four individually controllable positioning devices mounted on said cage structure and engageable with the body for jointly controlling the position of the body inertia axis relative to the axis of revolution of said cage structure, a pair of said devices being disposed near each of said respective journal means and having respective displacing directions corresponding to the directions of the respective two components at said journal means; tool means mounted on said supporting frame structure and movable from an inactive position to a position in engagement with the adjusted body on said cage structure; said drive comprising an electric drive motor and a main switch having a lever for starting said motor, a spring connected with said lever for normally holding it in switched-off position, a holding magnet cooperatively mounted with respect to said lever for holding it in switched-on position in opposition to said spring when said magnet is energized, said magnet having an energizing circuit comprising a first safety switch contact means disposed on said cage structure and a second safety switch contact means cooperatively disposed with respect to said tool means, said first and second contact means being operative to close said circuit only when said body is secured in said cage structure and said tool means are in inactive position.

11. Apparatus for the balance-centering of revolvable bodies, comprising a rigid supporting frame structure, two journal means oscillatorily mounted on said frame structure in axially spaced relations to each other, a cage structure for accommodating a body to be centered, said cage structure being revolvable in said journal means, a drive joined with said cage structure for revolving it; electric unbalance-measuring means joined with said journal means and selectively responsive to two coordinately directed oscillation components due to unbalance at each of said two journal means, said electric unbalance-measuring means comprising a pair of pickups fixed with respect to said supporting structure and operative to provide respective output voltages responsive to unbalance oscillations of said cage structure at each of said two journal means, said electric unbalance-measuring means comprising two sources of reference voltages of different phase synchronous with the cage revolution; four individually controllable positioning devices mounted on said cage structure and engageable with the body for jointly controlling the position of the body inertia axis relative to the axis of revolution of said cage structure, a pair of said devices being disposed near each of said respective journal means and having respective displacing directions corresponding to the directions of the respective two components at said journal means; tool means mounted on said supporting frame structure and movable from an inactive position to a position in engagement with the adjusted body on said cage structure; said tool means comprising two drill presses disposed at opposite axial sides respectively of said cage structure and having each a base slidable axially of said structure, a rack-and-pinion transmission interconnecting said two slides for moving them simultaneously in mutually opposed directions, said drive for revolving said cage structure having an electric motor, an energization circuit for said motor and a control switch in said circuit and cooperatively disposed wtih respect to said tool means to be actuated thereby for energizing said circuit and operating said motor only when said tool means are in inactive position.

References Cited in the file of this patent

UNITED STATES PATENTS

| | | |
|---|---|---|
| 1,017,193 | Whiton | Feb. 13, 1912 |
| 2,219,795 | Van Degrift | Oct. 29, 1940 |
| 2,243,379 | Johnson | May 27, 1941 |
| 2,363,373 | Werner | Nov. 21, 1944 |

FOREIGN PATENTS

| | | |
|---|---|---|
| 642,916 | Great Britain | Sept. 13, 1950 |

OTHER REFERENCES

Geortetes Answuchten, by H. O. Schatz in Zeitschrift Des Vereines Deutscher Ingenieure In NSBDT, July 8, 1944, Band 88, Nr. 27/28, pp. 358 and 359.